Sept. 22, 1964          J. E. CLARKE          3,149,700
ADJUSTABLE SUPPORTS FOR VEHICLE LIFTS
Filed July 6, 1962
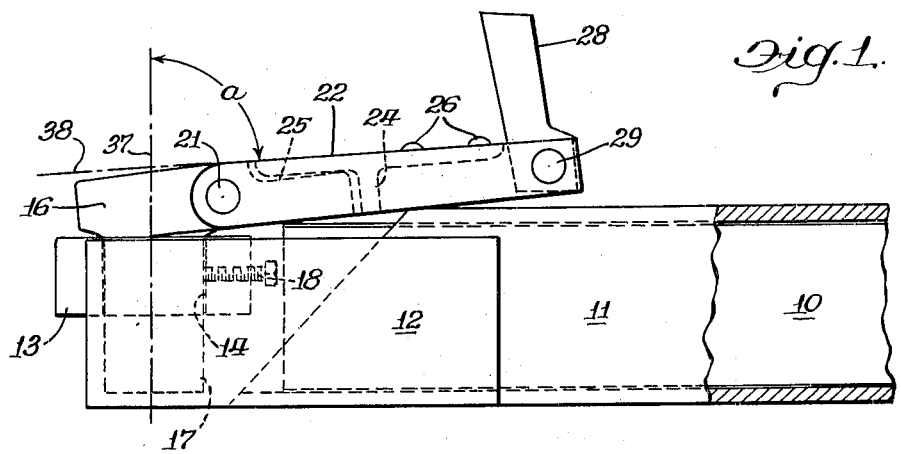
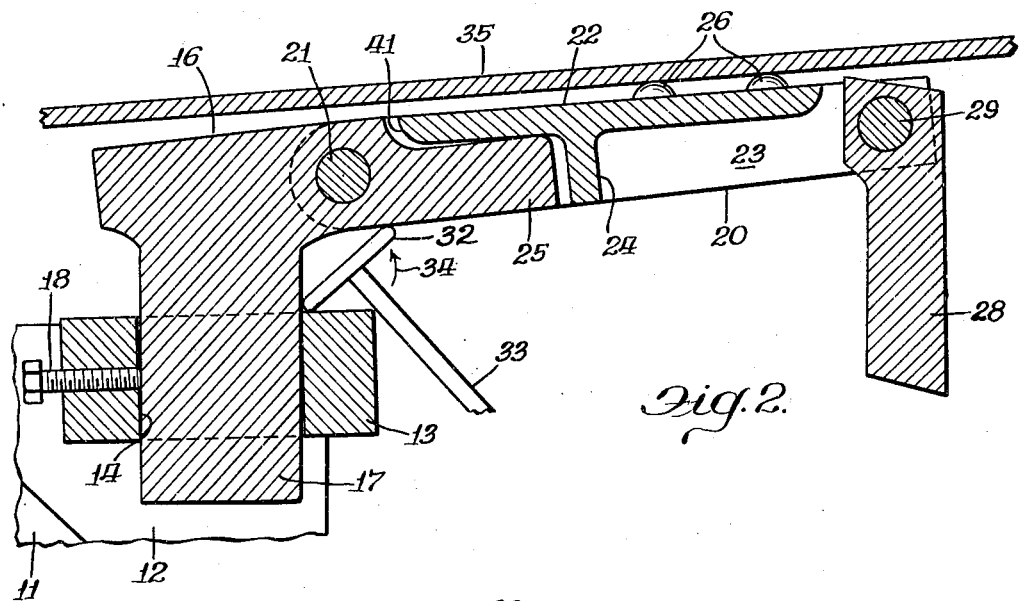
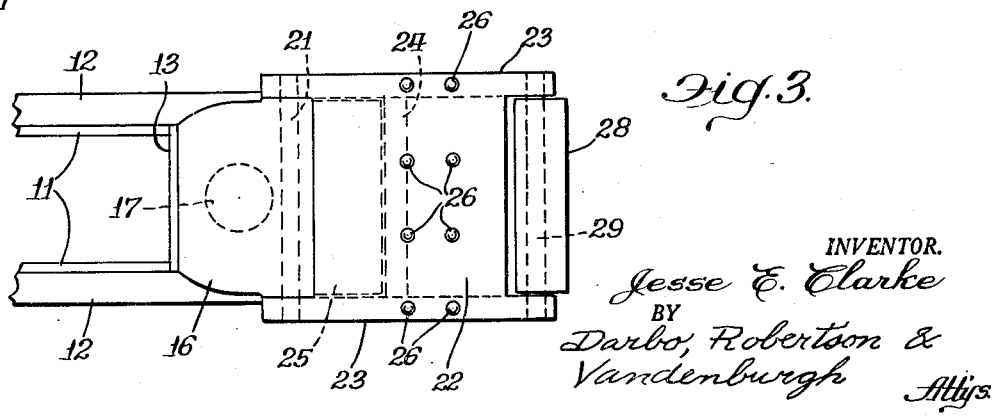
INVENTOR.
Jesse E. Clarke
BY Darbo, Robertson &
Vandenburgh
Attys.

United States Patent Office 3,149,700
Patented Sept. 22, 1964

3,149,700
ADJUSTABLE SUPPORTS FOR VEHICLE LIFTS
Jesse E. Clarke, Hinsdale, Ill., assignor to Autoquip Corporation, Chicago, Ill., a corporation of Illinois
Filed July 6, 1962, Ser. No. 208,010
10 Claims. (Cl. 187—8.75)

The present invention relates to an adjustable support for use on a vehicle lift.

There are two general types of vehicle lifts used by gasoline stations, garages, etc. One is generally referred to as a roll-on lift and the other has a frame lift. The present invention pertains to an improvement in the latter. Actually the designation of a frame lift no longer is completely descriptive since many automobiles are being made without a separate portion that can be designated as a "frame." In these vehicles the body as a whole is so designed that it provides the structural support normally supplied by what is designated as the frame in the historically more conventional type of automobile construction. Thus the term frame lift is used herein with respect to all vehicle lifts other than those in which the lifting force is applied to the wheels per se, i.e. those in which a contact member applies a lifting force to some other part of the vehicle.

Since the various makes and models of automobiles will vary widely as to the most appropriate points at which to engage and properly support the car, provision must be made in the frame lift type for adjustments to meet the varying needs. One adjustment often is that of positioning the four supports which contact the frame. A device which provides for an adjustment of this nature is illustrated and described in my prior U.S. Patent No. 3,004,630.

A second adjustment is an individual vertical height adjustment for each of the four supports. Such an adjustment usually is provided for several reasons. One is that the vehicle thereby is level, firmly seated on each of the four supports and is not in any danger of accidental dislodgment. A second reason is to prevent damage to the various items of equipment and other relatively fragile projections on the underside of the car. To avoid these and still properly support the vehicle may require height adjustments on the supports. Additionally, it is desirable that the vehicle be raised to the full extent of the stroke of the lifting ram. To achieve this, there should not be substantial ram travel before the supports engage the underside of the vehicle.

Many of today's automobiles are low slung having relatively little clearance height on the underside thereof. If a frame lift is not to be recessed in the floor (which has disadvantages) this requires that the structure thereof have a total height above the floor somewhat less than the lowest of the vehicles. About all of the available height often is necessary to obtain structural rigidity for the arms of the lift, unless they are of a width that is disadvantageous because of its limiting of access to the underside of the vehicle. This means that little, if any, of the available height can be employed in providing adjustment means for the supports.

A further such factor that must be taken into consideration in devising contact members or supports for a lift of this type is that in some instances a relatively large bearing area is required. In vehicles of the type wherein no separate "frame" is used, but rather with the body serving as such, it usually is not possible to have the supports bear only on a small area of the underside of the vehicle. The load per square inch of bearing area could well be more than the underside of the vehicle could withstand. As a consequence, it is necessary that there be a "pad" which has a sufficiently large bearing area that it will not bend or puncture the underside of the body.

Prior art provisions for supports of adjustable height have generally consisted of devices in which a "step" adjustment is provided. Thus parts may be moved between alternative positions, at one of which the contact member or support is at one height and at another of which it is at another height. This has the value of simplicity which is required both by reason of cost and also by reason of the lack of easy access to the supports when they are in the lifting position, particularly under a low slung vehicle. However, it has the disadvantage that oftentimes the range of adjustment is so large that difficulty is encountered. In some instances one step will be so low that parts of the underside of the car will be damaged should the lift be raised using this lower support. At the same time the next support height cannot be employed without first raising the car by other means, because the increased support height is higher than the bearing point on the underside of the vehicle.

To solve these problems I have devised a novel support which incorporates a stepless, infinite, adjustment within the range required. It can easily be adjusted by a person at the side of the vehicle. When the vehicle is to be removed from the lift and has been lowered onto the floor, it is a simple matter to retract the support so that it will clear the underside of the vehicle.

Embodiments of my invention are most simple. They can be made and sold competitively with the adjustable supports presently in use. A mechanic has no difficulty in understanding how to operate them. Substantially, no maintenance is required, yet they will have a relatively long trouble-free operating life. Should replacement be required for some reason, the operations required to do so can be performed quickly and easily. A minimum of waste motion between the vehicle and lift as the lift is raised provides the maximum possible working clearance under the vehicle after it has been raised.

Further objects and advantages will become apparent from the following description taken in conjunction with the drawings in which:

FIGURE 1 is an elevational view of an embodiment of the invention;

FIGURE 2 is a vertical section through the embodiment of FIGURE 1 (with the support rotated 180° with respect to the positioning arms) illustrating the use thereof in supporting a vehicle; and FIGURE 3 is a plan view.

Although the following disclosure offered for public dissemination is detaled to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose; as it is these that meet the requirement of pointing out the parts, improvements, or combinations in which the inventive concepts are found.

The embodiment illustrated and described is for use as one of the four contact members or supports on a hydraulic ram vehicle lift. For purposes of illustration it will be described as it would be used on the lift structure illustrated in United States Patent No. 3,004,630. Inner arm 10 of FIGURE 1 corresponds to one of inner arms 17 of the structure of the patent. Slidably received on inner arm 10 is an outer arm 11 corresponding in function, but not in the specific details of construction, to outer arm 18 of the patent structure. Extending from the outer end of outer arm 11, and at each side thereof respectively, are gusset plates 12. A bearing block 13 is affixed between gusset plates 12. Bearing block 13 has a cylindrical opening 14 therethrough with the cylindrical axis 37 of the opening approximately vertical.

A support member 16 has a cylindrical post 17 extending through opening 14 in the bearing block. Post 17 is of a cross-sectional size substantially corresponding to that of opening 14 except that it is only slightly smaller so that it will move freely through the opening when the axes of the two are aligned. As for example, in one embodiment opening 14 is drilled and reamed to a diameter of 1.500 inches while post 17 has a diameter of 1.495 inches. A screw 18 is threaded into a tapped hole in bearing block 13 along a radial line of the cylindrical opening. Screw 18 makes frictional contact with post 17 and may be adjusted so as to give the desired amount of frictional resistance to the movement of post 17 through the opening. Normally the screw is adjusted so that there is a slight frictional drag to the movement of the post through the bearing block.

A support pad 20, which also functions as a riser plate as hereinafter described, is pivotally attached to support member 16 by a pin 21. While in the illustrated embodiment, this is shown as a single pin, it could be formed as a pair of separate pins coaxially mounted at each side of the support member. Support pad 20 includes a bearing plate 22, two side members 23 and a flange 24. Support member 16 has a nose 25 on which rests the underside of bearing plate 22, adjacent flange 24. Nose 25 of the support member limits the extent to which the pad 20 will pivot downwardly about pin 21. A plurality of small anti-skid buttons 26 project from the upper face of pad 20 at a portion thereof which is spaced from post 17.

A flip tab 28 is pivotally secured between side plates 20 by pin 29. Again pin 29 could be made in two pieces rather than as a single part as illustrated.

Assuming that the apparatus is to be employed in raising an automobile having relatively low clearance and thus low pick-up points, the flip tab 28 is turned down as illustrated in FIGURE 2. Each of arms 10 is positioned, and the outer arms 11 adjusted thereon, so that buttons 26 of the respective support are under the appropriate pick-up point on the vehicle. The final adjustment of the support of each arm is made by raising the support with respect to the arm. The support of course is raised by moving post 17 upwardly through bearing block 13 until buttons 26 contact the vehicle at the pick-up point. Since there is only a silent frictional drag to the movement of the post through the bearing block, this easily can be performed.

For example, a tool having a blade 32 and a handle 33 is used to reach under the vehicle. Handle 33 is sufficiently long so that it may be manipulated without getting under the car. Blade 32 is inserted between bearing block 13 and the underside of nose 25 of the support member. Blade 32 is then rotated as indicated at 34 to raise the support member with respect to the bearing block. A special tool as illustrated is not a necessity since a person may reach under the vehicle with a stick or bar and, using two hands, lift upwardly on the support member without getting under the car. When the support member has been raised so that buttons 26 contact the underside of the vehicle frame or body, as the case may be, illustrated at 35, the frictional resistance supplied by screw 18 is sufficient to prevent the post 17 from again descending through the bearing block.

After all four support members have been similarly adjusted, the hydraulic ram is raised in the usual manner. As is particularly apparent from FIGURE 2, the load on the support member will be applied at some distance offset from the cylindrical axis of post 17. This causes the post to "cock" in bearing block 13 (illustrated with some exaggeration in FIGURE 2). This wedges post 17 in the bearing block so that the support pad 20 does not descend with respect to the arms 10 and 11.

To ensure that the load is applied to support pad 20 at some distance from the axis of post 17, the upper face of the support pad slopes upwardly away from the post. This is illustrated in FIGURE 1, which shows the support in the unloaded position. Line 37 represents the axis of post 17 which in the unloaded position (as shown in FIGURE 1) would be approximately coincident with the axis of opening 14 in bearing block 18. Line 38 represents the plane of the upper face of support pad 20. The angle $a$ in the illustrated embodiment is about 87°. To put it another way, the upper face of the support pad 20 slopes upwardly at about a 3° angle away from the vertical line of post 17.

Thus, even after a load is imposed, with some deflection of the parts and a cocking of post 17 in bearing block 13, the load on the support will be in the area of buttons 26 and will not be imposed adjacent post 17. Should the load move over adjacent post 17, the post will no longer be cocked sufficiently in the bearing block to prevent the two from sliding with respect to each other. In the illustrated embodiment, the cocking provides about a 32 to 1 clamping force to prevent the post from sliding in the bearing block. Thus, for example with a load of 500 pounds imposed as illustrated in FIGURE 2, the clamping force between post 17 and bearing block 13 is on the order of 16,000 pounds.

It is necessary that means be provided to ensure that the load on the adjustable support always is spaced to a side of post 17. An alternative to sloping the support pad would be to have the support pad offset upwardly from the portions immediately above the post. The sloping plus the raised buttons 26 in a sense achieves this, but it will be apparent from the disclosure that it could be achieved even though the upper face of the support pad were approximately horizontal when not loaded. The form illustrated and described is the best since the support is nearly horizontal when loaded providing a more secure positioning of the vehicle.

To remove the car from the lift, the hydraulic ram is fully lowered. Thereafter a sharp rap on the support member, as for example a rap by the tool illustrated in FIGURE 2 against one of gusset plates 12, will release post 17 from bearing block 13 and cause the post 17 to slide down into the bearing block to the lowered position of FIGURE 1. When all four supports have been thus lowered, the vehicle may be driven from the lift.

When a vehicle is to be raised which has slightly higher pick-up points than can be reached by the extent of movement of post 17 in bearing block 13, lifting tabs 28 then are employed. Invariably, such a vehicle has a frame (as distinguished from a vehicle in which there is no external frame but uses the body as such) and therefore a large bearing area is not necessary. With tabs 28 turned up to the position illustrated in FIGURE 1, each arm is adjusted so that the top of the tab is under the appropriate pick-up point of the vehicle. Thereafter the support members 16 are raised as was described in connection with FIGURE 2. Again it will be apparent that the load is offset with respect to post 17 so that upon raising the ram, the post will be locked in bearing block 13 as previously described. The procedure for lowering the vehicle and the support members likewise is the same.

The range of adjustment may be illustrated with respect to one embodiment in which post 17 is about 2½ inches long and the total height of the support member at the post is about 3½ inches. With tab 28 down, as in FIGURE 2, the support may be adjusted for the proper positioning of cars having pickup points of between about 3⅞ inches and 5⅛ inches from the ground. When tab 28 is raised to the FIGURE 1 position the adjustment range is increased to about 5⅞ inches to about 7⅛ inches from the ground to the pickup point. Of course, other ranges may be achieved, as desired, by changing the proportion of the parts.

Support pads 20 are pivotally mounted so that they may be employed to raise a truck. After the truck is over the lift, support pads 20 are pivoted upwardly to a position at which the end 41 of plate 22 is against the top of support member 16. This will be just slightly beyond the vertical position. In this event the load is imposed so close to post 17 that the post will not be cocked and locked in bearing block 13. Therefore no effort is made to perform the final adjustment of post 17 as described in connection with FIGURE 2. However, with the straight channel frames of a truck, the fine adjustment obtained by the movement of post 17 is not necessary. The length of support pad 20 when standing approximately vertical with respect to support member 16 provides adequate height to reach approximately to the frame of most trucks.

I claim:

1. In vehicle lift apparatus, the improvement in an adjustable vehicle contact structure comprising: a bearing block fixedly attached to the lift, said block having a cylindrical opening extending downwardly from the top surface thereof, and a support having a cylindrical post arranged in said opening and rotatable and axially slidable therein subject only to frictional restraint, said support having a supporting surface offset to one side of said post a distance sufficient to bind said post in said block when a load is imposed on said surface, said post being sufficiently smaller in diameter than said opening and said post extending above said block to permit said post to cock and bind in said block upon the imposition of a load on said supporting surface as aforesaid.

2. Apparatus in accordance with claim 1 and including friction means bearing against the post to restrain said post against movement except responsive to the application of a positive external force applied to the structure.

3. Apparatus in accordance with claim 2 wherein the friction means includes means for adjusting the magnitude of the friction applied to the post.

4. Apparatus in accordance with claim 1 and including friction means bearing against the post at approximately the mid-level of the block to restrain said post against movement except responsive to the application of a positive external force applied to the structure.

5. In vehicle lift apparatus, the improvement in an adjustable vehicle contact structure comprising: a bearing block fixedly attached to the lift, said block having a cylindrical hole extending vertically therethrough, and a support having a cylindrical post arranged in said hole and extending through and above and below said block, said post being rotatable and axially slidable in said hole subject only to frictional restraint, said support having a supporting surface offset to one side of said post a distance sufficient to bind said post in said block when a load is imposed on said surface, said post being sufficiently smaller in diameter than said hole to permit said post to cock and bind in said block upon the imposition of a load upon said supporting surface as aforesaid.

6. In a vehicle lift apparatus, the improvement in an adjustable vehicle contact member comprising: a bearing block attached to the lift, said block having a downwardly extending opening; and a support having a post slidably received in said opening and when aligned with the opening freely movable in an upwardly and downwardly direction with respect to the block, an arm extending to one side of said post and a supporting surface on said arm at a spaced distance from said post, said surface sloping upwardly in a direction away from said post, whereby as said lift raises said support into contact with a vehicle, at least the initial contact between the support and the vehicle will be at the portion of said surface farthest removed from said post to bind the post in said block.

7. In an apparatus as set forth in claim 6, wherein said surface includes upwardly extending buttons.

8. In vehicle lift apparatus, the improvement in an adjustable vehicle contact member comprising: a bearing block attached to the lift, said block having a downwardly extending opening; a support member including a post slidably received in said opening and a nose projecting to one side of the post; and a support pad pivotally attached to the member by generally horizontal pin means and extending beyond the nose in the direction of the pin means from the post, said pad overlying and resting on said nose, said pad having a supporting surface sloping upwardly in a direction away from said post.

9. In an apparatus as set forth in claim 8, wherein the pad includes a tab pivotal between a position above said surface and a position which is approximately no higher than said surface.

10. In an apparatus as set forth in claim 8, wherein the contact member includes an adjustable friction means between the block and the post.

References Cited in the file of this patent

UNITED STATES PATENTS

| | | |
|---|---|---|
| 205,635 | Hageman | July 2, 1878 |
| 895,833 | Aungst | Aug. 11, 1908 |
| 2,158,399 | Carter | May 16, 1939 |
| 2,769,507 | Pelouch | Nov. 6, 1956 |
| 2,769,508 | Pelouch | Nov. 6, 1956 |
| 2,777,538 | Cochin | Jan. 15, 1957 |
| 2,826,269 | Harr | Mar. 11, 1958 |
| 2,930,449 | Nupp et al. | Mar. 29, 1960 |
| 3,004,630 | Clarke | Oct. 17, 1961 |
| 3,036,662 | Pelouch | May 29, 1962 |

FOREIGN PATENTS

| | | |
|---|---|---|
| 202,045 | Australia | May 31, 1956 |